US012689081B2

(12) United States Patent　　(10) Patent No.: US 12,689,081 B2
Hartl et al.　　(45) Date of Patent: Jul. 21, 2026

(54) HOUSING PART, IN PARTICULAR MICROBATTERY AND METHOD FOR MANUFACTURING A HOUSING PART

(71) Applicant: Schott AG, Mainz (DE)

(72) Inventors: Helmut Hartl, Klosterneuburg (AT); Björn Ramdohr, Ergolding (DE)

(73) Assignee: SCHOTT AG, Mainz (DE)

( * ) Notice: Subject to any disclaimer, the term of this patent is extended or adjusted under 35 U.S.C. 154(b) by 812 days.

(21) Appl. No.: 17/946,494

(22) Filed: Sep. 16, 2022

(65) Prior Publication Data

US 2023/0014877 A1　　Jan. 19, 2023

Related U.S. Application Data

(63) Continuation of application No. PCT/EP2021/056018, filed on Mar. 10, 2021.

(30) Foreign Application Priority Data

Mar. 17, 2020　(DE) ..................... 10 2020 107 224.4
Nov. 13, 2020　(DE) ..................... 20 2020 106 518.1

(51) Int. Cl.
　*H01M 50/191*　　(2021.01)
　*C03C 10/00*　　(2006.01)
　　　(Continued)
(52) U.S. Cl.
　CPC ....... *H01M 50/191* (2021.01); *C03C 10/0054* (2013.01); *H01G 11/78* (2013.01);
　　　(Continued)
(58) Field of Classification Search
　CPC ............. H01M 50/191; H01M 50/564; H01M 50/198; H01M 50/34
　See application file for complete search history.

(56) References Cited

U.S. PATENT DOCUMENTS 961,672 A　　6/1910　Barnhurst
4,055,710 A　*　10/1977　May ................... H01M 10/3909
　　　　　　　　　　　　　429/104
(Continued)

FOREIGN PATENT DOCUMENTS

CN　　109980149 A　*　7/2019　............... H01G 2/14
CN　　109980155 A　　7/2019
　　　(Continued)

OTHER PUBLICATIONS

Notification of Transmittal of the International Preliminary Report on Patentability and the Written Opinion dated Sep. 29, 2022 for International Patent Application No. PCT/EP2021/056018 (12 pages).
(Continued)

*Primary Examiner* — Kenneth J Douyette
(74) *Attorney, Agent, or Firm* — TAYLOR & EDELSTEIN, PC

(57)　　　ABSTRACT

A housing part for an electrical device, which is an electrical storage device, a sensor housing, a battery, a microbattery, or a capacitor, the housing part including: a feedthrough, the housing part or a base body which is a part of the housing part including the feedthrough, the feedthrough having at least one opening, the at least one opening having a wall with a reduced enclosure length $EL_{red}$, the at least one opening configured for receiving a conductive material or a conductor in a glass material or a glass-ceramic material, the reduced enclosure length $EL_{red}$ being in a range of 0.05 mm to 0.6 mm, 0.1 mm to 0.5 mm, 0.1 mm to 0.4 mm, or 0.15 mm to 0.2 mm.

15 Claims, 5 Drawing Sheets

(51) Int. Cl.

| | |
|---|---|
| *H01G 11/78* | (2013.01) |
| *H01G 11/80* | (2013.01) |
| *H01M 50/148* | (2021.01) |
| *H01M 50/159* | (2021.01) |
| *H01M 50/169* | (2021.01) |
| *H01M 50/172* | (2021.01) |
| *H01M 50/184* | (2021.01) |
| *H01M 50/188* | (2021.01) |
| *H01M 50/198* | (2021.01) |
| *H01M 50/342* | (2021.01) |
| *H01M 50/552* | (2021.01) |
| *H01M 50/562* | (2021.01) |
| *H01M 50/564* | (2021.01) |

(52) U.S. Cl.

CPC .......... *H01G 11/80* (2013.01); *H01M 50/154* (2021.01); *H01M 50/159* (2021.01); *H01M 50/169* (2021.01); *H01M 50/172* (2021.01); *H01M 50/184* (2021.01); *H01M 50/188* (2021.01); *H01M 50/198* (2021.01); *H01M 50/3425* (2021.01); *H01M 50/552* (2021.01); *H01M 50/562* (2021.01); *H01M 50/564* (2021.01); *C03C 2204/00* (2013.01); *H01M 2200/20* (2013.01)

(56) References Cited

U.S. PATENT DOCUMENTS

| | | | |
|---|---|---|---|
| 4,841,101 | A | 6/1989 | Pollock |
| 5,015,530 | A | 5/1991 | Brow et al. |
| 5,773,959 | A | 6/1998 | Merritt et al. |
| 5,849,434 | A | 12/1998 | Miura et al. |
| 5,853,914 | A | 12/1998 | Kawakami |
| 5,874,185 | A | 2/1999 | Wang et al. |
| 5,900,183 | A | 5/1999 | Kronfli et al. |
| 5,952,126 | A | 9/1999 | Lee et al. |
| 6,190,798 | B1 | 2/2001 | Okada et al. |
| 6,433,276 | B1 | 8/2002 | Bellora |
| 7,687,200 | B2 | 3/2010 | Jouanneau-Si-Labri et al. |
| 10,231,339 | B2 | 3/2019 | Nagai et al. |
| 10,910,609 | B2 | 2/2021 | Hyung et al. |
| 11,205,569 | B2 | 12/2021 | Hettler |
| 2007/0187934 | A1 | 8/2007 | Fink |
| 2011/0014503 | A1* | 1/2011 | Bradwell ............. H01M 10/39 |
| | | | 429/50 |
| 2012/0203294 | A1 | 8/2012 | Troetzschel |
| 2015/0364735 | A1 | 12/2015 | Kohira et al. |
| 2016/0133888 | A1 | 5/2016 | Hartl |
| 2017/0222195 | A1 | 8/2017 | Hartl |
| 2021/0249720 | A1* | 8/2021 | Chen ..................... H01G 11/14 |

FOREIGN PATENT DOCUMENTS

| | | | |
|---|---|---|---|
| CN | 209691814 | U | 11/2019 |
| DE | 27 33 948 | A1 | 8/1978 |
| DE | 690 23 071 | T2 | 6/1996 |
| DE | 101 05 877 | A1 | 8/2001 |
| DE | 698 04 378 | T2 | 10/2002 |
| DE | 699 23 805 | T2 | 7/2005 |
| DE | 10 2007 063 188 | A1 | 6/2009 |
| DE | 11 2012 000 900 | A5 | 11/2013 |
| DE | 10 2013 006 463 | A1 | 10/2014 |
| DE | 10 2014 016 601 | A1 | 5/2016 |
| DE | 10 2017 221 426 | A1 | 5/2019 |
| EP | 0 412 655 | A2 | 2/1991 |
| EP | 0 885 874 | A1 | 12/1998 |
| EP | 0 954 045 | A2 | 11/1999 |
| EP | 3 081 258 | A1 | 10/2016 |
| EP | 3 588 606 | A1 | 1/2020 |
| GB | 2 020 888 | A | 11/1979 |
| WO | 2012/110242 | A1 | 8/2012 |
| WO | 2012/110244 | A1 | 8/2012 |
| WO | 2012/110246 | A1 | 8/2012 |
| WO | 2012/167921 | A1 | 12/2012 |
| WO | 2014/176533 | A1 | 10/2014 |
| WO | 2020/104571 | A1 | 5/2020 |

OTHER PUBLICATIONS

International Search Report dated Jun. 14, 2021 for International Patent Application Serial No. PCT/EP2021/056018 (5 pages).

"Handbook of Batteries", published by David Linden, 2nd issue, McGrawhill, 1995, Chapters 36 & 39 (88 pages).

\* cited by examiner

Fig.1
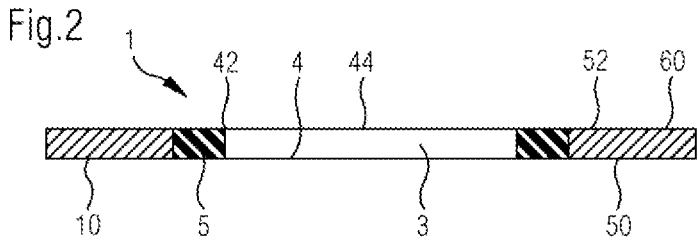
Fig.2
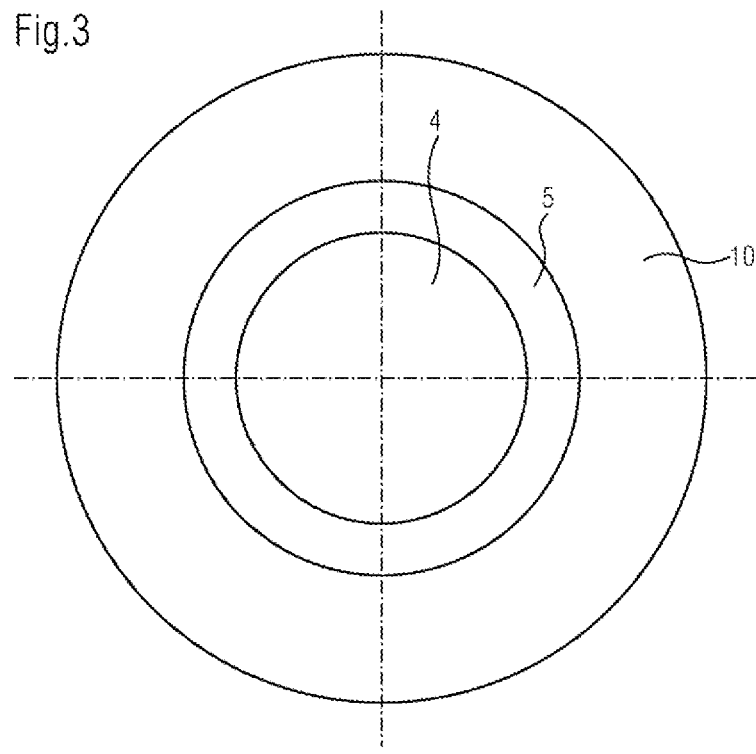
Fig.3

Fig.6a
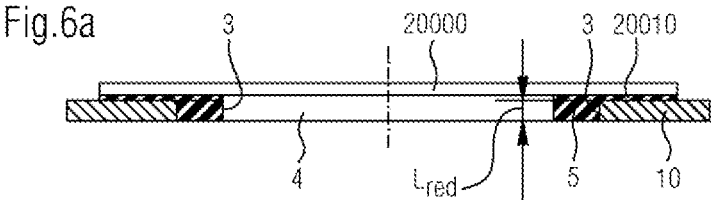
Fig.6c
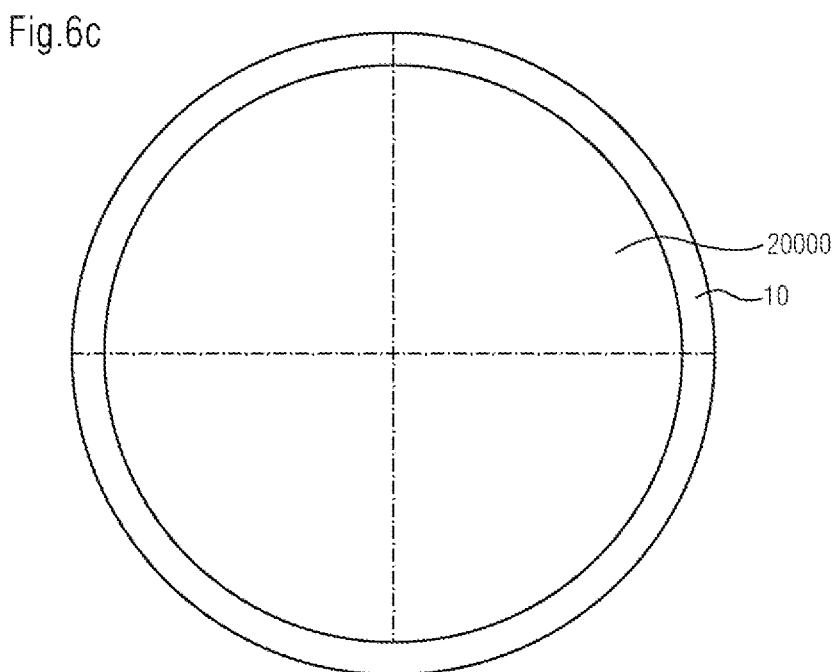
Fig.6b

HOUSING PART, IN PARTICULAR MICROBATTERY AND METHOD FOR MANUFACTURING A HOUSING PART

CROSS REFERENCE TO RELATED APPLICATIONS

This is a continuation of PCT Application No. PCT/EP2021/056018, entitled "HOUSING PART, IN PARTICULAR MICROBATTERY AND METHOD FOR PRODUCING A HOUSING PART", filed Mar. 10, 2021, which is incorporated herein by reference. PCT Application No. PCT/EP2021/056018 claims priority to (a) German Patent Application No. 10 2020 107 224.4, filed Mar. 17, 2020, which is incorporated herein by reference, and (b) German Patent Application No. 20 2020 106 518.1, filed Nov. 13, 2020, which is incorporated herein by reference.

BACKGROUND OF THE INVENTION

1. Field of the Invention

The present invention relates to a housing part of an electrical device, in particular an electrical storage device, optionally a battery, in particular a microbattery and/or a capacitor, having a feedthrough passing through a housing part, wherein the housing part and/or the feedthrough has at least one opening, wherein the opening receives a conductor in a glass or glass-ceramic material and the opening of the feedthrough includes an inner wall. In addition to the housing part, in particular of an electrical device, a method for producing a base body, optionally in ring form, in particular for an electrical device, is also disclosed, as well as a microbattery.

2. Description of the Related Art

In the sense of the present invention, batteries are understood to be both disposable batteries, which can be disposed of and/or recycled after having been discharged, as well as accumulators. Accumulators, optionally lithium-ion batteries, are intended for various applications such as portable electronic devices, cell phones, power tools, as well as, in particular, electric vehicles. The batteries can replace traditional energy sources such as lead-acid batteries, nickel-cadmium batteries or nickel-metal hydride batteries. It is also possible to use the battery in sensors or in the Internet of Things.

In the sense of the present invention, storage devices also include capacitors, in particular also supercapacitors.

Supercapacitors, also called supercaps, are, as is generally known, electrochemical energy storage devices with particularly high power density. In contrast with ceramic, film and electrolytic capacitors, supercapacitors have no dielectric in the conventional sense. In particular, they incorporate the storage principles of static storage of electric energy by charge separation in a double-layer capacitance as well as the electrochemical storage of electrical energy by charge exchange with the aid of redox reactions in a pseudocapacitor. Supercapacitors include, in particular, hybrid capacitors, in this, in particular lithium-ion capacitors. Their electrolyte commonly includes a solvent in which conductive salts are dissolved, commonly lithium salts. Supercapacitors optionally used in applications in which a high number of charge/discharge cycles is required. Supercapacitors are particularly advantageous for use in the automotive sector, especially in the area of recuperation of brake energy. Other applications are, of course, equally possible and encompassed by the invention.

Lithium-ion batteries as storage devices have been known for many years. In this regard, reference is made, for example, to "Handbook of Batteries," David Linden, editor, $2^{nd}$ edition, McGraw-Hill, 1995, chapters 36 and 39.

Various aspects of lithium-ion batteries are described in a large number of patents.

For example, mention may be made of: U.S. Pat. No. 961,672 A1, U.S. Pat. No. 5,952,126 A1, U.S. Pat. No. 5,900,183 A1, U.S. Pat. No. 5,874,185 A1, U.S. Pat. No. 5,849,434 A1, U.S. Pat. No. 5,853,914 A1, and U.S. Pat. No. 5,773,959 A1.

Lithium-ion batteries, in particular for applications in an automotive environment, typically have a plurality of individual battery cells connected together in series. The battery cells connected together in series are combined into so-called battery packs, and multiple battery packs are then combined into a battery module, which is also referred to as a lithium-ion battery. Each individual battery cell has electrodes that are led out of a battery cell housing. The same applies to supercapacitor housings.

A multitude of issues, such as corrosion resistance, resistance in the case of accidents and vibration resistance need to be solved, in particular, for applications of lithium-ion batteries in the automotive environment. Another problem is tightness, especially hermetic tightness, over a long period of time.

Leakages, for example, in the area of the electrode of the battery cell or alternatively of the electrode feedthrough in the battery cell and/or the housing of capacitors and/or supercapacitors can impair tightness. Such leakages could be caused, for example, by thermal cycling and alternating mechanical loads such as vibrations in the vehicle or aging of the plastics.

A short circuit or temperature change of the battery or alternatively the battery cell can lead to a reduced service life of the battery or alternatively the battery cell. Equally important is the tightness in the case of an accident and/or emergency situation.

For example, to ensure better resistance in the case of an accident, DE 101 05 877 A1 proposes a housing for a lithium-ion battery, wherein the housing includes a metal shell that is open on both sides and which is actively closed.

The power connection or alternatively the electrode are insulated by a synthetic material. Disadvantages of plastic insulations are limited temperature resistance, limited mechanical resistance, aging, and uncertain leak tightness over the service life. Thus, the current feedthroughs in the prior art lithium-ion batteries and capacitors are not hermetically sealed, for example, in the cover portion of the lithium-ion battery. It is for this reason that, in the prior art, a helium leakage rate of maximum $1 \times 10^{-6}$ mbar $I/s^{-1}$, depending on the test specifications, is usually achieved at a pressure difference of 1 bar. Furthermore, the electrodes are crimped, and laser-welded connecting components with additional insulators are arranged in the space of the battery.

DE 27 33 948 A1 discloses an alkaline battery in which an insulator such as, for example, glass or ceramic is directly connected to a metal part by a fused joint.

One of the metal parts is electrically connected to an anode of the alkaline battery and the other is electrically connected to a cathode of the alkaline battery. The metals used in DE 27 33 948 A1 are iron or steel. Lightweight metals such as aluminum are not described in DE 27 33 948 A1. The melting temperature of the glass or ceramic material is also not specified in DE 27 33 948 A1. The alkaline battery described in DE 27 33 948 A1 is a battery with an alkaline electrolyte, which according to DE 27 33 948 A1 contains sodium hydroxide or potassium hydroxide. There is no mention of Li-ion batteries in DE 27 33 948 A1.

A method for the preparation of asymmetric organic carboxylic acid esters and for the preparation of anhydrous organic electrolytes for alkaline-ion batteries has become known from DE 698 04 378 T2 or alternatively EP 0 885 874 B1. Electrolytes for rechargeable lithium-ion cells are also described in DE 698 04 378 T2 or alternatively EP 0 885 874 B1.

Materials for the cell base, which receives the through-plating, are not described, only materials for the connecting pin, which can be made of titanium, aluminum, a nickel alloy or stainless steel.

DE 699 23 805 T2 or alternatively EP 0 954 045 B1 describes an RF feedthrough with improved electrical efficiency. The feedthroughs known from EP 0 954 045 B1 are not a glass-metal feedthrough. In EP 0 954 045 B1, glass-metal feedthroughs that are installed directly inside, for example, the metal wall of a packaging, are described as disadvantageous, inasmuch as such RF feedthroughs are not durable due to the embrittlement of the glass.

DE 690 230 71 T2 and EP 0 412 655 B1 describe a glass-metal feedthrough for batteries or other electrochemical cells, where the glasses used have an $SiO_2$ content of about 45% by weight and wherein the metals that are used are, in particular, alloys including molybdenum and/or chromium and/or nickel. The use of lightweight metals is not described in DE 690 23 071 T2, nor are melting temperatures or fusion temperatures for the glasses used. According to DE 690230 71 T2 or alternatively EP 0 412 655 B1, alloys which molybdenum, niobium or tantalum are described as materials for the pin-shaped conductors.

U.S. Pat. No. 7,687,200 A1 discloses a glass-metal feedthrough for lithium-ion batteries. According to U.S. Pat. No. 7,687,200 A1, the housing was made of stainless steel and the pin-shaped conductor was made of platinum/iridium. TA23 and CABAL-12 glass materials are indicated in U.S. Pat. No. 7,687,200 A1. According to U.S. Pat. No. 5,015,530 A1, CaO—MgO—$Al_2O_3$—$B_2O_3$ systems with melting temperatures of 1025° C. or alternatively 800° C. are dealt with. Furthermore, glass compositions for glass-metal feedthroughs for lithium batteries have become known from U.S. Pat. No. 5,015,530 A1, which compositions include CaO, $Al_2O_3$, $B_2O_3$, SrO and BaO, the melting temperatures of which fall in the range 650° C.-750° C. and are thus too high for use together with lightweight metals.

The post-published U.S. Pat. No. 10,910,609 B2 shows an electrical feedthrough for a battery housing, in particular a microbattery, wherein a borosilicate glass is used as the glass material. A CaBAI 12 glass or a BaBAI-1 glass are mentioned as special glass materials. Statements relating to the expansion coefficients of glass materials, base bodies and conductors are not made in U.S. Pat. No. 10,910,609 B2.

U.S. Pat. No. 4,841,101 A1 discloses a feedthrough in which a substantially pin-shaped conductor is enclosed into a metal ring with a glass material. The metal ring is, in turn, then inserted into an opening or bore of a housing and connected to the inner wall or bore by soldering, for example by way of the use of a solder ring, in particular by an integral bond. The metal ring is made of a metal that has substantially the same or a similar coefficient of thermal expansion as the glass material, in order to compensate for the high coefficient of thermal expansion of the aluminum of the battery housing. In the embodiment described in U.S. Pat.

No. 4,841,101A1, the length of the metal ring is always shorter than the hole or opening in the housing.

WO 2012/167921 A1, WO 2012/110242 A1, WO 2012/110246 A1 and WO 2012/110244 A1 disclose feedthroughs which are passed through a housing part of a housing for a storage device. In the feedthroughs, a cross-section in a glass or glass ceramic material is passed through the opening.

In DE 27 33 948 A1, a feedthrough is shown passing through a housing part of a battery, wherein the housing part has at least one opening, wherein the opening includes a conductive material as well as a glass or glass ceramic material, and wherein the conductive material is formed as a cap-shaped element. However, no indication is given in DE 27 33 948 A1 of which specific material the conductor is made of. Likewise, the thickness or wall thickness of the cap-shaped element specified in DE 27 33 948 A1 is not indicated.

U.S. Pat. No. 6,190,798 A1 discloses a battery with a feedthrough that has an opening, wherein a cap-shaped element is inserted as a conductor into the opening in an insulating material, which may be glass or a resin. There is also no specification of the thickness of the wall of the cap-shaped element in U.S. Pat. No. 6,190,798 B1.

US 2015/0364 735 A1 shows a battery with a cap-shaped cover, which cover has areas of reduced thickness as a safety outlet in case of pressure overload.

A conically shaped overpressure safety device is disclosed in WO 2014/176 533 A1. An application for batteries is not described in WO 2014/176 533 A1.

DE 10 2007 063 188 A1 shows a battery with at least one individual cell enclosed by a housing and a housing-like overpressure protection in the form of one or more predetermined breaking points or one or more rupture discs.

U.S. Pat. No. 6,433,276 A1 shows a feedthrough in which the metallic housing part, conductor and glass material have substantially the same coefficient of expansion.

DE 10 2014 016 601 A1 shows a housing part, in particular of a battery housing or capacitor housing, having a feedthrough, wherein a conductor, in particular a substantially pin-shaped conductor, is passed through a feedthrough opening in a glass or glass ceramic material having a glass material outer dimension and an enclosure length, wherein the component has, in the region of the feedthrough opening, a reinforcement having a component feedthrough opening thickness, wherein the component feedthrough opening thickness is greater than the component thickness and wherein the reinforcement has a reinforcement material outer dimension.

EP 3588606 A1 discloses a housing component including at least two bodies made of lightweight metal. According to EP 3588606 A1, the first body is a lightweight metal and the second body is a lightweight metal with welding promoters, in particular in the form of alloying components of the lightweight metal. A welded joint is formed between the first and second bodies.

DE 10 2013 006 463 A1 shows a battery feedthrough, optionally for a lithium-ion battery, optionally a lithium-ion accumulator having at least one base body, which base body has at least one opening, through which opening is passed at least one conductor, in particular a substantially pin-shaped conductor in an electrically insulating material, which conductor includes or consists of a sealing glass, wherein the base body includes or consists of a lightweight metal and/or a lightweight metal alloy, optionally selected from aluminum, magnesium, titanium, an aluminum alloy, a magnesium alloy, a titanium alloy or AlSiC. The sealing glass according to DE 10 2013 006 463 A1 is a titanate glass with low phosphate content.

DE 10 2017 221 426 A1 shows a special type of feedthrough. The feedthrough disclosed in DE 10 2017 221 426 A1 includes a plurality of conductors enclosed in an opening, wherein a plurality of the enclosed conductors is connected by a flat conductor.

The post-published WO 2020/104571 A1 discloses an electrical storage device having a feedthrough, wherein the feedthrough is recessed into a battery cover part having a collar. Furthermore, the post-published WO 2020/104571 A1 discloses the provision of a flexible flange in the area of the feedthrough.

For a feedthrough, DE 11 2012 000 900 B4 describes a glass, in particular a solder glass, including the following components in mol-%:

$P_2O_5$ 37-50 mol-%, in particular 39-48 mol-%
$Al_2O_3$ 0-14 mol-%, in particular 2-12 mol-%
$B_2O_3$ 2-10 mol-%, in particular 4-8 mol-%
$Na_2O$ 0-30 mol %, in particular 0-20 mol %
$M_2O$ 0-20 mol-%, in particular 12-19 mol-%, wherein M can be =K, Cs, Rb,
$Li_2O$ 0-42 mol-%, in particular 0-40 mol-%, optionally 17-40 mol-%
BaO 0-20 mol-%, in particular 0-20 mol-%, optionally 5-20 mol-%
$Bi_2O_3$ at least 1 mol-%, in particular 1-5 mol-%, optionally 2-5 mol-%,
wherein the glass is free of lead except for impurities.

A disadvantage of all electrical devices, in particular storage devices in the prior art, was that the known electrical devices, in particular storage devices were very large and did not include compact housings. This has then led to storage devices with large dimensions, in particular large heights.

The electrical devices, in particular storage devices, known from the prior art were thus not usable as microbatteries due to their size.

Another problem with electrical devices with conventional feedthroughs was the use of plastics for electrical insulation. By way of example, nylon, polyethylene, and polypropylene are described as insulation materials in DE 27 33 948 A1. Further disadvantages were very low push-out forces for the metal pin inserted into the insulation material.

What is needed in the art is therefore a housing part for an electrical device, in particular a storage device, as well as a microbattery and a method for manufacturing a housing part or alternatively a base body for an electrical device, which avoids the disadvantages of the prior art and is characterized by a limited thickness of the material and thereby of the dimensions of the housing. Furthermore, what is needed in the art is that the electrical device which is enclosed by the housing is to be characterized by a large active volume.

In particular, a compact and sealed storage device with small dimensions of optionally<0.6 mm is needed in the art, which can be used as a microbattery and optionally has sufficient tightness. The sufficient tightness shall be provided even if the laser welding heats the material.

In addition, a limited housing thickness is needed in the art, which, in addition to compactness, also leads to savings of material. Furthermore, a safe electrical insulation of the conductor inserted into the feedthrough opening of the housing, in particular metal pins, is needed. In so doing, what is needed in the art is a storage device which itself is constructed in such a compact manner that as much active volume as possible is made available in the interior of the housing, whereby the battery and/or the capacitor can have as high a capacity as possible. Therefore, the storage device with feedthrough according to the present invention is in particular a microbattery.

The present invention therefore also relates, in particular, to hermetically sealed microbatteries with a feedthrough which is produced as shown in the application, by way of example, by the method described and claimed in the application.

Typical applications of microbatteries are, by way of example, active RFID and/or medical devices such as hearing aids, blood pressure sensors and/or wireless headphones. The term is frequently used in this context and is thus generally known. Likewise, microbatteries are of interest for the "Internet of Things".

If one wants to provide storage devices, especially microbatteries with a thickness<0.6 mm, the problem of the properties of such thin components arises. Components or alternatively housing parts with very limited thicknesses of, for example, less than 0.3 mm housing thickness are critical in terms of the necessary mechanical strength. A further problem of such thin bodies is that a sufficient push-out force is needed in the art for the enclosed conductor, and pressure tightness is not given.

SUMMARY OF THE INVENTION

According to the present invention, the present invention provides a housing part for an electrical device having a feedthrough, wherein the feedthrough has an opening with an inner wall and an enclosure length $EL_{red}$, wherein the enclosure length $EL_{red}$ is in the range 0.05 mm to 0.6 mm. Furthermore, in the case of the enclosure of the conductor into the opening, we are dealing with a compression enclosure, which is to say the coefficient of expansion of the housing part $\alpha_3$, which receives the feedthrough with opening, is always greater than the coefficient of expansion $\alpha_2$ of the glass or glass-ceramite material into which the enclosure takes place.

It is optional if a third expansion coefficient $\alpha_3$ of the housing part is in the range $10 \times 10^{-6}$ 1/K to $19 \times 10^{-6}$ 1/K and a second coefficient of expansion of the glass or glass-ceramic material $\alpha_2$ is in the range $6 \times 10^{-6}$ 1/K to $12 \times 10^{-6}$ 1/K.

In a further embodiment, the first coefficient of expansion al of the conductor is in the range $6 \times 10^{-6}$ 1/K to $12 \times 10^{-6}$ 1/K.

The material used for the housing part and/or the conductor is optionally a metal, in particular iron, iron alloys, nickel, iron-nickel alloys, iron-nickel-cobalt alloys, KOVAR (an iron-nickel-cobalt alloy), steel, high-grade steel, stainless steel, aluminum, an aluminum alloy, AlSIC (aluminum silicon carbide), magnesium, a magnesium alloy, copper, a copper alloy or titanium or a titanium alloy.

In particular, the housing part is a battery cover part with a thickness $D_2$, wherein $D_2$ is in the range 0.05 mm to 1 mm, optionally 0.05 mm to 0.6 mm. A particularly good compression enclosure is achieved if the housing part is made from one of the following materials:

a ferritic stainless steel with a coefficient of expansion in the range 10 to $12 \times 10^{-6} K^{-1}$;
a mild steel having a coefficient of expansion in the range 12 to $13 \times 10^{-6} K^{-1}$;
a duplex stainless steel with a coefficient of expansion in the range 13 to $14 \times 10^{-6} K^{-1}$;
an austenitic stainless steel with a coefficient of expansion in the range 16 to $18 \times 10^{-6} K^{-1}$.

Optionally, the material of the housing part is selected in such a way that the glass pre-tension, which also acts on the conductor via glass, and thus the push-out force of the conductor, is adjusted. By adjusting the push-out force of the conductor, a safety vent function of the conductor, in particular the opening of a storage device, in particular batteries in the case of overpressure in the event of damage, can be adjusted in the housing part.

The push-out force of the conductor can also be adjusted by one or more of the following:

the thickness of the enclosure;

the use of different glass materials;

different void fractions in the glass;

a structured glass surface due to the shape of the glass molding prior to the enclosure process;

a structured glass surface due to the shape of the glass molding during the enclosure process;

a structured glass surface by way of a laser machining after the enclosure process;

scoring or tapering in the glass material on one or two sides;

scoring or tapering in the conductor and/or housing or housing part or base body;

the length of the enclosure and/or the formation of menisci.

In addition to the housing portion, the present invention also provides a microbattery having a housing portion with a feedthrough. The housing part, as previously described, is made of a metal, optionally iron, iron alloys, iron-nickel alloys, iron-nickel-cobalt alloys, KOVAR, steel, high-grade steel, stainless steel, aluminum, an aluminum alloy, AlSiC, magnesium, a magnesium alloy, or titanium or a titanium alloy. The housing part has at least one opening as part of the feedthrough, the opening having an inner wall with an enclosure length $EL_{red}$ and the opening receiving a conductive material, in particular a conductor received in a glass or glass ceramic material. Optionally, the reduced enclosure length $EL_{red}$ is in the range of 0.05 mm to 0.6 mm, in particular 0.1 to 0.4 mm, optionally 0.15 mm to 0.2 mm. The conductive material has a first coefficient of expansion $\alpha_1$, the glass or glass ceramic material has a second coefficient of expansion $\alpha_2$, and the housing part has a third coefficient of expansion $\alpha_3$. To provide compression enclosure, the third coefficient of expansion $\alpha_3$ of the housing part is always greater than the second coefficient of expansion $\alpha_2$ of the glass or glass ceramic material, resulting in compression enclosure.

All the advantages of a housing part described above are also the subject matter of the special configuration of a housing part configured as a microbattery. Optionally, the housing part is a cover of a microbattery. The cover of a microbattery provided with a feedthrough is optionally connected to the housing of the microbattery by way of welding, resulting in the microbattery.

In accordance with the present invention, a possible method is also specified with which housing thicknesses of less than 0.6 mm, in particular less than 0.3 mm, optionally in the range 0.1 mm to 0.3 mm, can be realized and the pressure tightness as well as mechanical strength and push-out force of the feedthrough are guaranteed. In the place of the method described below for reducing the thickness and thereby also the enclosure length, a direct enclosure into a very small housing thickness of less than 0.6 mm would also be possible.

One possible method initially provides for enclosure of the conductor into an opening with an enclosure length EL that is significantly longer than the desired thickness, which is then followed by a subsequent reduction of the thickness after the completion of the enclosure, such that there is a reduced enclosure length $EL_{red}$. A pressure-tight enclosure is ensured by enclosure, for example, in an enclosure length EL of 0.6 mm. The pressure-tight enclosure is thereby maintained by inserting the conductor into a glass material. The glass material with inserted conductor is then inserted into an opening of a housing or housing part. Alternatively, it would also be possible for an insertion into a base body. The housing or alternatively housing part or alternatively base body is then heated and subsequently cooled such that the glass or glass ceramic material shrinks onto the surrounding metal in the form of the housing or alternatively housing part as it cools. The cooling process is crucial for the production of a pressure-tight and mechanically strong enclosure. During cooling, a pressure-tight feedthrough of the conductor is formed due to the differences in expansion of the glass material and the surrounding metal. In the present application, the term pressure-tight is understood to mean that the helium leakage rate is less than $1\times10^{-8}$ mbar 1/s at 1 bar pressure difference. If a base body is enclosed, according to the invention, following reduction of the thickness, the base body can be inserted into the opening of a thin metal sheet having, for example, a thickness of 0.2 mm, and can, for example, be connected to the metal sheet in a pressure-tight manner by welding.

As described, the present invention is characterized in that the conductor is enclosed as part of a compression enclosure. The compression force in the case of compression enclosure is provided by the different coefficients of expansion of the glass material and the surrounding housing material. A sufficient pre-tension is exerted on the glass or glass ceramic material by the material of the housing or of a base body inserted into the housing having a coefficient of expansion $\alpha_3$ that is greater than the coefficient of expansion $\alpha_2$ of the glass material. The conductor or metal pin has a first coefficient of expansion $\alpha_1$.

The conductive material, in particular, the conductor, has a first coefficient of expansion $\alpha_1$, optionally of up to $11\times10^{-6}$1/K. The coefficient of expansion $\alpha_2$ of the glass or glass-ceramic material is optionally in the range 9 to $11\times10^{-6}$1/K and the coefficient of expansion $\alpha_3$ of the housing part, in the range 12 to $19\times10^{-6}$1/K.

Tension is built up on the glass material by the housing or base body and compression enclosure is provided through the coefficient of expansion $\alpha_3$ of the housing material, or alternatively of the base body, which coefficient of expansion is greater than that of the glass.

When compared to an adapted feedthrough, in which the coefficients of expansion $\alpha_2$, $\alpha_1$ and $\alpha_3$ are substantially the same, compression enclosure has the advantage that the leaks that can occur in an adapted feedthrough after the laser welding process are reliably avoided, inasmuch as a pre-tension is always applied to the compression enclosure and thus to the enclosed conductor by the housing part or alternatively base body surrounding the opening. Another advantage of compression enclosure is the increased mechanical strength due to the compressive stress.

In an optional embodiment of the invention, reducing the thickness of the enclosed conductor in an opening of a base body is accomplished by grinding and/or lapping of the housing as well as of basic body and of the glass or glass-ceramic material with the enclosed conductor, so that the enclosure length is reduced. The specified grinding and/or lapping removal processes are characterized in that the removal process is applicable to both the metallic material of the housing/base body and to the glass or glass-ceramic material. The applicability of the removal process to both materials is central to the selection of possible removal processes. This way of reducing the enclosure length is one possible method, other methods are conceivable. According to the invention, the enclosure length $EL_{red}$ is between 0.1 mm and 0.8 mm. The very limited enclosure length $EL_{red}$ of between 0.1 mm and 0.6 mm can be achieved in a first embodiment of the invention by providing an enclosure length EL that is significantly greater than the reduced enclosure length $EL_{red}$ d. By way of example, the enclosure length EL of the conductor inserted into a housing opening in a glass material is 0.6 mm or more. A range of between 0.6 mm and 0.8 mm is optional. This thickness of the conductor with an enclosure length EL inserted into a housing or base body is reduced by the lapping or grinding process to thicknesses of between 0.1 mm and 0.3 mm, optionally between 0.15 mm and 0.3 mm. The reduced enclosure length $EL_{red}$ in the context of the compression enclosure is then between 0.1 mm and 0.5 mm, optionally between 0.15 mm and 0.3 mm.

Optionally, the reduction of the thickness of the enclosed conductor and the base body to a reduced enclosure length $EL_{red}$ is carried out by way of a lapping or grinding process. After the lapping and/or grinding process, the thickness D of the body part corresponds to the reduced enclosure length $EL_{red}$. The reduction of the thickness of the enclosed conductor can be performed either on one side or on two sides.

In the case of two-sided machining, both the upper and the lower side of the housing or base body with enclosed conductor are processed, for example, they are ground or lapped. By way of the grinding and lapping process, surface defects in the glass material result, with reduced enclosure length, for example grooves or scores, which can be uniform or non-uniform. If the removal machining is only carried out on one side, a coating can, for example, be applied to the non-processed side, which can once again be contacted. By way of example, it is possible to apply a nickel plating as a coating. A one-sided removal is also advantageous if the conductor and/or the glass material protrudes on one side.

If the opening is die cut in the base body or in the housing part into which the enclosure is to be inserted, the problem of tear-off edges arises due to the die cutting process. In the area of the tear-off edges, the die cutting indents, the die cutting tears, and the die cutting burrs, this results in the direction of pressure from the metal ring or base body to the glass material in the opening not being 90°, which reduces the pre-tension on the glass material. It is therefore optional if all edges resulting from die cutting can be eliminated in a die cut opening before the enclosure process starts, thereby leaving clean hole surfaces.

In addition to the method for producing an enclosure in a housing part with reduced thickness, the present invention also provides a housing part itself, in particular of an electrical device, optionally an electrical storage device or a sensor housing, optionally a battery, in particular a microbattery or capacitor with reduced enclosure length of between 0.15 mm and 0.6 mm, as well as a microbattery.

It is optional if the glass or glass-ceramic material includes a solid, in particular, a solid and crystallizing glass or glass-ceramic material. In order to achieve an increase in strength in the glass or glass-ceramic material into which the conductor is enclosed, it is advantageous if the glass or glass-ceramic material is provided with a filler to increase strength.

As materials for the housing part and the feedthrough, as well as the conductor, a stainless steel can be considered. The use of stainless steel has the advantage that protection against corrosion is not necessary after grinding. As an alternative to a stainless steel conductor, it can be provided that the housing part or the base body in which the conductor is enclosed is made of a steel and the conductor is made of NiFe. For such a combination of materials, it is necessary to apply a corrosion protection, for example, in the form of a nickel layer, to prevent corrosion.

The conductor, which is enclosed into the opening, can be contacted, for example, by welding, in particular by laser welding, by resistance welding or by ultrasonic welding. The outer conductor, for example, in the form of a base body, is hermetically sealed to the battery housing, likewise by welding, in particular by laser welding, by resistance welding or by ultrasonic welding, as well as by crimping.

The electrical device according to the invention, in particular electrical storage device or sensor housing, optionally battery, in particular microbattery or capacitor with a feedthrough passing through a housing part has a material thickness or thickness optionally in the range between 0.1 mm and 1 mm, optionally between 0.15 mm and 0.8 mm, in particular between 0.15 mm and 0.6 mm. The material used for the housing part is a metal, in particular iron, iron alloys, iron-nickel alloys, iron-nickel-cobalt alloys, KOVAR, steel, stainless steel, aluminum, an aluminum alloy, AlSiC, magnesium, a magnesium alloy or titanium or a titanium alloy. The housing part has at least one opening as part of a feedthrough, wherein the opening receives a conductive material, in particular a conductor made of a conductive material, in a glass or glass ceramic material.

An optional material for the housing part is a duplex stainless steel or austenitic stainless steel.

Duplex stainless steel is a steel with a two-phase microstructure consisting of a ferrite (a-iron) matrix with islands made of austenite. Duplex stainless steels share the properties of chromium stainless steels (ferritic or martensitic) and high-grade Chromium-nickel steels (austenitic) combined. They have higher strengths than high-grade chromium-nickel steels but are more ductile than high-grade chromium steels. The coefficient of expansion for duplex stainless steels is $\alpha_3 \approx 15 \times 10^{-6} 1/K$, whereas that of austenitic stainless steels is $\alpha_G \approx 18 \times 10^{-6} 1/K$.

The conductor is optionally made of a ferritic stainless steel and is formed as a ferritic stainless steel pin with an expansion coefficient of $\alpha_{Conductor}$ of between 10 and $11 \times 10^{-6} 1/K$. The glass material is optionally a glass material with a coefficient of expansion $\alpha_{Glass}$ in the range between 9 and $11 \times 10^{-6} 1/K$.

In order to avoid a short circuit of the connection to the outer conductor with the metallic housing of the storage device, for example, the battery or the capacitor, it can be provided that an insulation element is arranged on the glass or glass ceramic material, which can, in particular, be made of plastics or glass or glass ceramic. As an alternative to the separate insulating element, it is also possible to provide a glass material projecting beyond the edge, for example, made of a foaming glass.

According to the invention, an electrical device, in particular a storage device, is disclosed which has a feedthrough which enables a conductor to be contacted and provides as much installation space as possible inside the housing. Furthermore, the device according to the invention is designed to be hermetically sealed and exhibits improved compatibility with the brittle sealing material in the event of mechanical and/or pressure loading, in particular in the region between the contact and the sealing material. The increase in installation space can, in particular, help to increase the capacity of the storage device.

The connection of the housing part according to the invention, by way of example, a cover, which includes the feedthrough or alternatively the base body with enclosed conductor, to the housing can be made by welding, in particular laser welding, but also by soldering. The connection, for example by welding, is such that the helium leakage rate is more limited than $1\times10^{-8}$ mbar 1/s at 1 bar pressure difference. This means that the helium leakage rate is identical to that for the enclosed conductor and a hermetically sealed housing is provided for a storage device, in particular a battery.

Particularly compact electrical storage devices are provided when the electrical storage device has an overall height of no more than 5 mm, in particular no more than 4 mm, optionally no more than 3 mm, in particular in the range from 1 mm to 5 mm, optionally 1 mm to 3 mm, as in the case of microbatteries.

The glass or glass-ceramic material may contain fillers which serve, in particular, to adjust the thermal expansion of the glass or glass-ceramic material.

The optional glass or glass-ceramic material is an alumoborate (which can be referred to as aluminoborate) glass with the main constituents $Al_2O_3$, $B_2O_3$, $BaO$ and $SiO_2$. Optionally, the coefficient of expansion of such a glass material is in the range between 9.0 and 9.5 ppm/K or alternatively between 9.0 and $9.5\times10^{-6}$ K and thereby in the range of the coefficient of expansion of the metal forming the housing and/or the metal pin. The coefficient of expansion mentioned is particularly advantageous when stainless steel is used, in particular ferritic or austenitic stainless steel or duplex stainless steel. In such a case, the coefficient of expansion of the stainless steel is similar to that of the alumoborate glass.

The pre-tension for the compression enclosure is substantially determined by the different coefficients of expansion of the material of the housing part, in particular the sheet metal part.

The conductor is introduced through the glass or glass-ceramic material into the feedthrough hole in a hermetically sealed manner. The term hermetically sealed means a helium leakage rate of $1\times10^{-8}$ mbar 1/s at 1 bar pressure difference.

The following numbered sentences form part of the Summary of the Invention and thus represent elements of the present invention:

1. A housing part for an electrical device, which is an electrical storage device, a sensor housing, a battery, a microbattery, or a capacitor, the housing part including:

a feedthrough, the housing part or a base body of the housing part including the feedthrough, the feedthrough having at least one opening, the at least one opening having a wall with a reduced enclosure length $EL_{red}$, the at least one opening configured for receiving a conductive material or a conductor in a glass material or a glass-ceramic material, the reduced enclosure length $EL_{red}$ being in a range of 0.05 mm to 0.6 mm, 0.1 mm to 0.5 mm, 0.1 mm to 0.4 mm, or 0.15 mm to 0.2 mm.

2. The housing part according to sentence 1, wherein the conductive material or the conductor has a first coefficient of expansion $\alpha_1$, the glass material or the glass-ceramic material has a second coefficient of expansion $\alpha_2$, and the housing part has a third coefficient of expansion $\alpha_3$, wherein the third coefficient of expansion $\alpha_3$ is always greater than the second coefficient of expansion $\alpha_2$.

3. The housing part according to sentence 2, wherein the third coefficient of expansion $\alpha_3$ is in a range of $12\times10^{-6}$ 1/K to $19\times10^{-6}$ 1/K, and the second coefficient of expansion $\alpha_2$ is in a range of $9\times10^{-6}$ 1/K to $11\times10^{-6}$ 1/K.

4. The housing part according to sentence 2, wherein the first coefficient of expansion $\alpha_1$ is in a range of $6\times10^{-6}$ 1/K to $11\times10^{-6}$ 1/K.

5. The housing part according to sentence 1, wherein a metal of at least one of the housing part, the base body, and the conductor is one of the following materials: iron, an iron alloy, an iron-nickel alloy, an iron-nickel-cobalt alloy, KOVAR, steel, high-grade steel, stainless steel, aluminum, an aluminum alloy, AISIC, magnesium, a magnesium alloy, copper, a copper alloy, titanium, or a titanium alloy.

6. The housing part according to sentence 1, wherein the housing part or the base body is a battery cover part with a thickness $D_2$, wherein $D_2$ is in a range of 0.1 mm to 1 mm or 0.1 mm to 0.6 mm.

7. The housing part according to sentence 1, wherein the housing part or the base body consists of one of the following materials:

a ferritic stainless steel with a coefficient of expansion in a range 10 to $12\times10^{-6}$ $K^{-1}$;

a mild steel having a coefficient of expansion in a range 12 to $13\times10^{-6}$ $K^{-1}$;

a duplex stainless steel with a coefficient of expansion in a range 13 to $14\times10^{-6}$ $K^{-1}$; or an austenitic stainless steel with a coefficient of expansion in a range 16 to $18\times10^{-6}$ $K^{-1}$.

8. The housing part according to sentence 1, wherein a glass pre-tension is set up by way of at least one material of the housing part or of the base body, the glass pre-tension also acting on the conductor via a glass and sets up a push-out force of the conductor.

9. The housing part according to sentence 8, wherein through an adjustment of the push-out force of the conductor, a safety vent function of the conductor, which is provided by the at least one opening of the electrical storage device, which is formed as the battery, is set in a case of an overpressure in an event of a damage.

10. The housing part according to sentence 8, wherein the push-out force of the conductor is adjusted by at least one of the following measures:

a thickness of an enclosure of the housing part;

using different ones of a plurality of glass materials;

a plurality of different void fractions in a glass;

a structured glass surface due to a shape of a glass molding prior to an enclosure process;

a structured glass surface due to a shape of a glass molding during an enclosure process;

a structured glass surface due to a laser machining after an enclosure process;

scoring or tapering in the glass material on one or two sides of the glass material;

scoring or tapering in at least one of the conductor, a housing of the electrical device, the housing part, and the base body.

11. The housing part according to sentence 1, wherein the conductor includes a head part, which is a terminal head.

12. The housing part according to sentence 11, wherein the housing part is configured such that an insulating element, which is an insulating washer, is arranged between a connection head part of the head part of the conductor and the housing part.

13. The housing part according to sentence 12, wherein the insulating element is a glass, a glass-ceramic element, or a ceramic.

14. The housing part according to sentence 1, wherein a material of the glass material or the glass-ceramic material is an aluminoborate glass.

15. The housing part according to sentence 14, wherein the aluminoborate glass includes $Al_2O_3$ and $B_2O_3$.

16. A microbattery, including:

a housing part including a feedthrough, the housing part including a metal, the housing part further including at least one opening as a part of the feedthrough, the at least one opening including an inner wall with a reduced enclosure length $EL_{red}$, the at least one opening configured for receiving a conductive material in a glass material or a glass-ceramic material, the enclosure length $EL_{red}$ being in a range from 0.05 mm to 0.6 mm, from 0.1 mm to 0.4 mm, or from 0.15 mm to 0.2 mm, the conductive material having a first coefficient of expansion al, the glass material or the glass-ceramic material having a second coefficient of expansion $\alpha_2$, the housing part having a third coefficient of expansion $\alpha_3$, and the third coefficient of expansion $\alpha_3$ being always greater than the second coefficient of expansion $\alpha_2$.

17. The microbattery according to sentence 16, wherein the third coefficient of expansion $\alpha_3$ is in a range of $12\times10^{-6}$ l/K to $19\times10^{-6}$ l/K, and the second coefficient of expansion $\alpha_2$ is in a range of $9\times10^{-6}$ l/K to $11\times10^{-6}$ l/K, wherein the housing part includes a base body, the base body being made of the metal, which is iron, an iron alloy, an iron-nickel alloy, an iron-nickel-cobalt alloy, KOVAR, steel, high-grade steel, stainless steel, aluminum, an aluminum alloy, AISIC, magnesium, a magnesium alloy, titanium, or a titanium alloy, the conductive material being formed as a conductor.

18. The microbattery according to sentence 16, wherein the first coefficient of expansion al is in a range of $6\times10^{-6}$ l/K to $11\times10^{-6}$ l/K.

19. The microbattery according to sentence 16, further including a housing, wherein a metal of at least one of the housing, a base body of the housing part, and a conductor, which the conductive material forms, is iron, an iron alloy, an iron-nickel alloy, an iron-nickel-cobalt alloy, KOVAR, steel, high-grade steel, stainless steel, aluminum, an aluminum alloy, AISIC, magnesium, a magnesium alloy, copper, a copper alloy, titanium, or a titanium alloy.

20. The microbattery according to sentence 16, wherein the microbattery has an overall height of at most 40 mm, at most 20 mm, at most 5 mm, at most 4 mm, or at most 3 mm, and in a range of 1 mm to 40 mm, 1 mm to 5 mm, or 1 mm to 3 mm.

21. The microbattery according to sentence 16, wherein the microbattery includes, as the housing part, a battery cover part having a thickness $D_2$, wherein $D_2$ is in a range from 0.1 mm to 1 mm or from 0.1 mm to 0.6 mm.

22. The microbattery according to sentence 16, wherein the housing part or a base body of the housing part is made of one of the following materials:

a ferritic stainless steel with a coefficient of expansion in a range of 10 to $12\times10^{-6}$ $K^{-1}$;

a mild steel with a coefficient of expansion in a range of 12 to $13\times10^{-6}K^{-1}$;

a duplex stainless steel with a coefficient of expansion in a range of 13 to $14\times10^{-6}K^{-1}$;

an austenitic stainless steel with a coefficient of expansion in a range of 16 to $18\times10^{-6}K^{-}$.

23. The microbattery according to sentence 16, wherein the conductive material is formed as a conductor, wherein through an adjustment of a push-out force of the conductor from the glass material or the glass-ceramic material, a safety vent function of the conductor, which is provided by the at least one opening of a storage device, which is formed as a battery, is set in a case of an overpressure in an event of a damage.

24. The microbattery according to sentence 16, wherein the conductive material is formed as a conductor, a push-out force of the conductor being adjusted by at least one of the following measures:

a thickness of an enclosure of the housing part;

using different ones of a plurality of glass materials;

a plurality of different void fractions in a glass;

a structured glass surface due to a shape of a glass molding prior to an enclosure process;

a structured glass surface due to a laser machining after an enclosure process;

scoring or tapering in the glass material on one or two sides of the glass material;

scoring or tapering in at least one of the conductor, a housing of the microbattery, the housing part, and a base body of the housing part.

25. The microbattery according to sentence 16, wherein the conductive material is formed as a conductor, the conductor including a head part, which is a terminal head.

26. The microbattery according to sentence 25, wherein the housing part is configured such that an insulating element, which is an insulating washer, is arranged between a terminal head part of the head part of the conductor and the housing part.

27. The microbattery according to sentence 26, wherein the insulating element is a glass, a glass-ceramic element, or a ceramic.

28. A method for producing a base body of an electrical device, the method including the steps of:

providing that the base body includes a feedthrough, the feedthrough including at least one opening, the at least one opening of the feedthrough including an inner wall and being configured for receiving a conductive material formed as a conductor in a glass material or a glass-ceramic material, the at least one opening including an enclosure length EL along the inner wall;

inserting the conductor into the glass material or the glass-ceramic material in the at least one opening of the base body;

heating the base body, with the conductor and the glass material or the glass-ceramic material inserted into the at least one opening over the enclosure length EL, and then cooling the base body, with the conductor and the glass material or the glass-ceramic material inserted into the at least one opening over the enclosure length EL, so that a compression enclosure takes place; and reducing, by machining, the enclosure length EL of the glass material or the glass-ceramic material inserted into the at least one opening with the conductor which is enclosed, resulting in a reduced enclosure length $EL_{red}$.

29. The method according to sentence 28, wherein the machining is at least one of a grinding, a lapping, and another removal method of the glass material or the glass-ceramic material inserted into the at least one opening and of the conductor which is enclosed, the machining being a removal method which can be applied simultaneously to a metal and a glass, wherein the base body is in a ring-shaped form and is for a housing part of an electrical device, an electrical storage device, a sensor housing, a battery, a microbattery, or a capacitor.

30. The method according to sentence 28, wherein the base body has a thickness D which corresponds to the reduced enclosure length $EL_{red}$.

31. The method according to sentence 28, wherein the reduced enclosure length $EL_{red}$ is in a range of 0.05 mm to 0.6 mm, 0.1 mm to 0.5 mm, 0.1 mm to 0.4 mm, or 0.15 mm to 0.2 mm.

32. The method according to sentence 28, wherein the glass material or the glass-ceramic material inserted into the at least one opening includes an upper side and a lower side, and the machining is carried out on at least one of the upper and the lower side.

33. A housing part of an electrical device, which is an electrical storage device, a sensor housing, a battery, a microbattery, or a capacitor, the housing part including:

a base body which is produced by a method including the steps of:

providing that the base body includes a feedthrough, the feedthrough including at least one opening, the at least one opening of the feedthrough including an inner wall and being configured for receiving a conductive material formed as a conductor in a glass material or a glass-ceramic material, the at least one opening including an enclosure length EL along the inner wall;

inserting the conductor into the glass material or the glass-ceramic material in the at least one opening of the base body;

heating the base body, with the conductor and the glass material or the glass-ceramic material inserted into the at least one opening over the enclosure length EL, and then cooling the base body, with the conductor and the glass material or the glass-ceramic material inserted into the at least one opening over the enclosure length EL, so that a compression enclosure takes place; and reducing, by machining, the enclosure length EL of the glass material or the glass-ceramic material inserted into the at least one opening with the conductor which is enclosed, resulting in a reduced enclosure length $EL_{red}$.

34. The housing part according to sentence 33, wherein the glass material or the glass-ceramic material of the base body is a high-strength material, a high-strength crystallizing glass-glass-ceramic material, or a glass material with a filler for increasing strength, or a glass-ceramic material with a filler for increasing strength.

35. The housing part according to sentence 33, wherein at least one of the base body, the feedthrough, and the conductor includes a first material that includes a higher coefficient of expansion than a second material of at least one of the conductor and the glass material, the first material being steel, ferritic steel, stainless steel, duplex stainless steel, or austenitic stainless steel.

36. The housing part according to sentence 33, wherein the base body includes a steel, and the conductor includes NiFe and a corrosion protection layer.

37. A housing for an electrical device with a housing part including a base body, the electrical device being an electrical storage device, a sensor housing, a battery, a microbattery, or a capacitor, the housing including:

the housing which is configured for being hermetically sealed with the base body, which is produced by a method including the steps of:

providing that the base body includes a feedthrough, the feedthrough including at least one opening, the at least one opening of the feedthrough including an inner wall and being configured for receiving a conductive material formed as a conductor in a glass material or a glass-ceramic material, the at least one opening including an enclosure length EL along the inner wall;

inserting the conductor into the glass material or the glass-ceramic material in the at least one opening of the base body;

heating the base body, with the conductor and the glass material or the glass-ceramic material inserted into the at least one opening over the enclosure length EL, and then cooling the base body, with the conductor and the glass material or the glass-ceramic material inserted into the at least one opening over the enclosure length EL, so that a compression enclosure takes place; and reducing, by machining, the enclosure length EL of the glass material or the glass-ceramic material inserted into the at least one opening with the conductor which is enclosed, resulting in a reduced enclosure length $EL_{red}$.

38. The housing according to sentence 37, wherein the housing is configured for being hermetically sealed with the base body by welding, laser welding, resistance welding, or ultrasonic welding.

39. A microbattery, including:

a housing part of an electrical device which is an electrical storage device, a sensor housing, a battery, a microbattery, or a capacitor, the housing part including:

a base body, which is produced by a method including the steps of:

providing that the base body includes a feedthrough, the feedthrough including at least one opening, the at least one opening of the feedthrough including an inner wall and being configured for receiving a conductive material formed as a conductor in a glass material or a glass-ceramic material, the at least one opening including an enclosure length EL along the inner wall;

inserting the conductor into the glass material or the glass-ceramic material in the at least one opening of the base body;

heating the base body, with the conductor and the glass material or the glass-ceramic material inserted into the at least one opening over the enclosure length EL, and then cooling the base body, with the conductor and the glass material or the glass-ceramic material inserted into the at least one opening over the enclosure length EL, so that a compression enclosure takes place; and reducing, by machining, the enclosure length EL of the glass material or the glass-ceramic material inserted into the at least one opening with the conductor which is enclosed, resulting in a reduced enclosure length $EL_{red}$.

40. The microbattery according to sentence 39, wherein the microbattery has an overall height of at most 40 mm, at most 20 mm, at most 5 mm, at most 4 mm, or at most 3 mm, and in a range of 1 mm to 40 mm, 1 mm to 5 mm, or 1 mm to 3 mm.

41. The microbattery according to sentence 40, wherein the housing part is a battery cover with a thickness $D_2$, wherein $D_2$ is in a range of 0.1 mm to 1 mm or 0.1 mm to 0.6 mm.

42. The microbattery according to sentence 39, wherein the housing part consists of one of the following materials:

a ferritic stainless steel having a coefficient of expansion in a range of 10 to $12 \times 10^{-6} K^{-1}$;

a mild steel having a coefficient of expansion in a range of 12 to 13×10⁻⁶K';

a duplex stainless steel having a coefficient of expansion in a range of 13 to 14×10⁻⁶K⁻¹; or an austenitic stainless steel having a coefficient of expansion in a range of 16 to 18×10⁻⁶K⁻¹. The microbattery according to sentence 39, wherein a safety vent function of the conductor, which is provided by the at least one opening, is set by adjusting a push-out force of the conductor in a case of an overpressure in an event of a damage.

44. The microbattery according to sentence 43, wherein the push-out force of the conductor is adjusted by at least one of the following measures:

a thickness of an enclosure of the housing part;

using different ones of a plurality of glass materials;

a plurality of different void fractions in a glass a structured glass surface due to a shape of a glass molding prior to an enclosure process;

a structured glass surface due to a laser machining after an enclosure process;

scoring or tapering in the glass material on one or two sides of the glass material;

scoring or tapering in at least one of the conductor, a housing of the microbattery, the housing part, and the base body of the housing part;

a length of the enclosure and a formation of menisci.

45. The microbattery according to sentence 39, wherein the glass material or the glass-ceramic material introduced between the conductor and the base body does not form a meniscus with the base body.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 shows a cross-section through a housing part, in particular a battery cover with an opening into which a conductor is enclosed, before reduction of the thickness;

FIG. 2 shows a cross-section through a housing part according to FIG. 1 with a conductor enclosed into the opening after reduction of the thickness;

FIG. 3 shows a top view of a housing part according to FIG. 2;

FIG. 6a shows a battery cover of a microbattery with enclosed conductor and connection head;

FIG. 6b shows detail according to FIG. 6a of a battery cover with enclosed conductor and connection head;

FIG. 6c shows a top view looking down on an enclosed conductor with a connection button;

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 5:
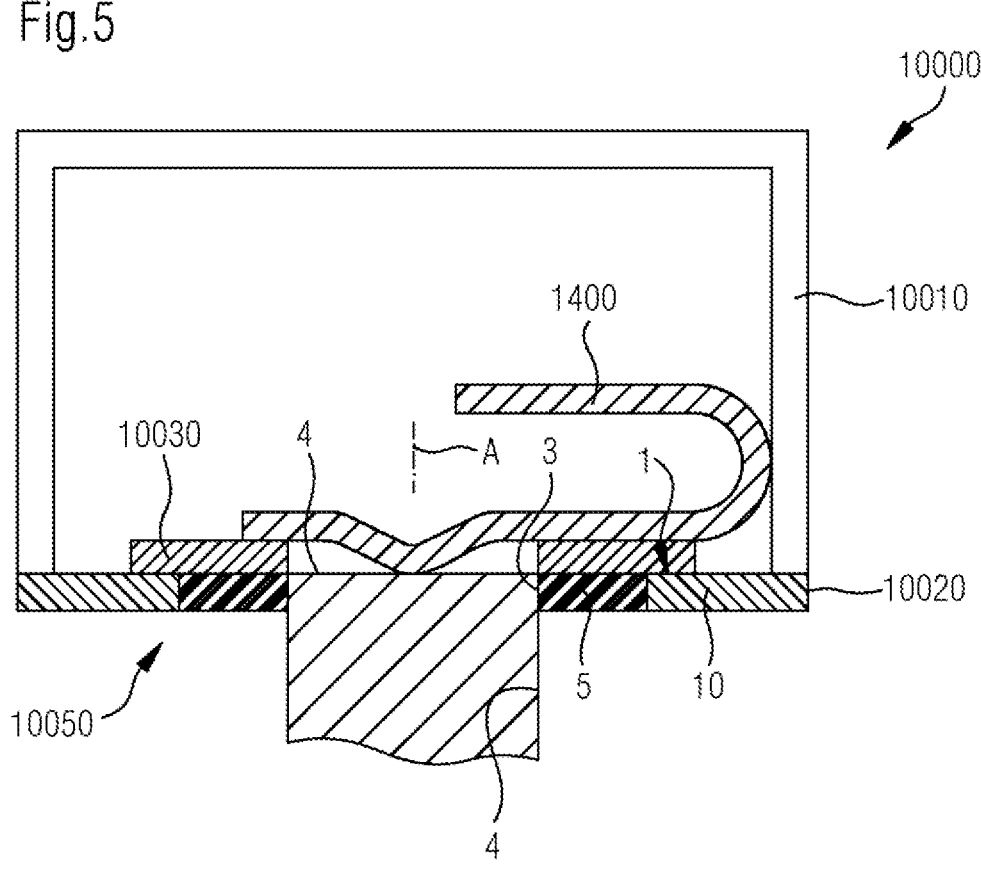
FIG. 5 shows a microbattery with a housing part according to the invention or alternatively battery cover with reduced enclosure length according to FIGS. 2 and/or 3.

FIG. 1 illustrates a housing part according to the present invention as part of a housing, in particular a housing of a storage device, for example, a battery as shown in FIG. 5. The housing part or sheet metal part 1 includes a base body 10 with a feedthrough with opening 3, into which a glass ceramic material 5 is enclosed in a glass into the conductor 4. The glass material can optionally be an alumoborate glass with the main constituents $Al_2O_3$, $B_2O_3$, BaO and $SiO_2$. The enclosure is initially carried out in an opening with a sufficient enclosure length EL on the inner wall of the opening. This means that initially a housing part or alternatively a metal sheet with a sufficient wall thickness and therefore an enclosure length of, for example, 0.6 mm is provided for enclosure of a conductor 4 in a glass or glass ceramic material 5. This length is sufficient to provide compression enclosure. An opening 3 is initially made in the housing part 1 or the sheet metal part with a sufficient wall thickness of, for example, 0.6 mm, for example, using a die cutting process. After the opening 3 has been made, for example, by a die cutting process in the housing part or sheet metal part 1, a conductor 4 is enclosed into the housing part or alternatively into the base body 10 with an enclosure length EL or thickness or material thickness. This is done by inserting the conductor in a glass material into the opening. Thereinafter, the housing part or the base body 10 is heated so that the glass material melts onto the housing part or the base body 10. Due to the different coefficients of expansion of the housing part or the base body 10 and the glass material, compression enclosure is formed. The housing part or the base body is thereinafter sealed together with the enclosed conductor 4 that is reduced in thickness, for example, by grinding or lapping. The enclosure length EL is initially 0.6 mm; the enclosure length $EL_{red}$ reduced by grinding or lapping of the entire housing part or base body 10 with enclosed conductor 4, for example, is a thickness of 0.2 mm. Both the housing part or alternatively the base body 10 with enclosed conductor 4 can be reduced in thickness, wherein the base body 10 with enclosed conductor 4 that is reduced in thickness can be inserted after the reduction in thickness, for example, into a housing part 1, in particular, into an opening of a housing part, and connected thereto, for example, by welding. Enclosure of the conductor 4 into a base body 10 has the advantage that the enclosure and the heating as well as the subsequent reduction in thickness of the base body 10 are carried out first, and only after the machining of the base body 10 with conductor 4 has been completed is it further processed, for example, connected to a housing part or alternatively to a housing by welding. The base body 10 is optionally a ring-shaped metal body, in particular a metal ring.

Inasmuch as, according to the present invention, the reduction in thickness only takes place after enclosure, this has the advantage that, due to the material thickness along the enclosure length EL of the component or base body which has not been reduced in thickness, a pre-tension is exerted on the glass or glass ceramic material because of the different coefficients of expansion of the sheet metal part or of the housing part or of the base body and glass or glass ceramic material or alternatively conductor, such that a compression enclosure of the conductor is made available. The compression enclosure is characterized in that the helium leakage rate is less than $1 \times 10^{-8}$ mbar 1/sec at 1 bar pressure difference. According to the invention, the coefficient of expansion $\alpha_1$ of the conductor and the coefficient of expansion $\alpha_2$ of the glass material are different from the coefficient of expansion $\alpha_3$ of the housing material or alternatively base body. In order to apply the necessary pre-tension, the coefficient of expansion $\alpha_3$ of the housing part or alternatively of the base body is approximately 2 to $8 \times 10^{-6}$ 1/K greater than the coefficient of expansion $\alpha_1$ of the conductor and/or the glass ceramic material $\alpha_2$. The coefficient of expansion $\alpha_3$ of the housing part or of the base body, in particular of the sheet metal part, lies, for example, in the range 12 to $19 \times 10^{-6}$ 1/K, whereas that of the conductive material and/or of the glass or glass ceramic material is in the range of 9 to $11 \times 10^{-6}$ 1/K. The coefficient of expansion $\alpha_3$ of the housing part or alternatively of the base body is always greater than $\alpha_2$ of the glass or glass-ceramic material, such that compression enclosure is provided.

The housing part or the base body 10, into which the enclosure takes place, is optionally made of a duplex stainless steel with a coefficient of expansion of approximately $15 \times 10^{-6}$ 1/K or of an austenitic material with a coefficient of expansion of approximately $18 \times 10^{-6}$ 1/K. It is optional if the material of the base body 10 is an austenitic material, in particular, an austenitic stainless steel. Due to the high coefficient of expansion of the basic body 10, in particular in the form of a ring-shaped body or ring element made of austenitic material, a higher push-out force and a higher mechanical strength are provided. The ring-shaped base body 10 into which the enclosure occurs can also be steel, in particular ferritic steel with an expansion coefficient of 10 to $12 \times 10^{-6}$ 1/K. Stainless steel is also possible.

With the illustrated embodiment of a housing part or alternatively of a base body, compression enclosure is also provided after reduction in thickness, with limited thicknesses of, for example, less than 0.8 mm, in particular 0.6 mm. It is optional if the thickness is reduced to a value of 0.2 mm or 0.4 mm.

FIG. 1 shows the enclosure length EL, as well as the reduced enclosure length $EL_{red}$. FIG. 1 also furthermore shows the material of the housing part or alternatively of the base body which is removed by lapping or grinding. The material removed by machining is marked with the reference number 40 for the housing part or alternatively for the base body 10. The protruding glass material is designated with the reference number 42 and the protruding conductor is designated with 44. In FIG. 1, the machining of the housing component or alternatively of the base body 10 is carried out only on one side, in the present case on the lower side 50. The upper side of the housing part is marked with reference number 52. The one-sided machining for reduction in thickness or reduction of the enclosure length from EL to $EL_{red}$ has the advantage that the conductor 4 can project over the glass material 5 and the upper side 52 of the housing part. An alumoborate glass or a silicate glass are, for example, used for the glass material.

FIG. 2 shows the housing part according to the invention after the lapping and/or grinding machining of the lower side 50 and the resulting reduction in thickness or reduction of the enclosure length. The same components as in FIG. 1 are assigned the same reference numbers. The thickness of the housing material or alternatively of the base body 10 with enclosed conductor is reduced during machining from, for example, a starting point of 0.6 mm as seen in FIGS. 1, to 0.4 mm as the end point of the grinding/lapping process, as shown in FIG. 2. Final thicknesses of 0.2 mm, 0.1 mm, even down to 0.05 mm are also possible as the end point. The largest thickness from which the grinding or lapping process starts can be 1 mm, optionally 0.8 mm or alternatively 0.6 mm. In principle, the thickness from which the grinding process can be started is variable, so the previously indicated information is to be understood as being given only by way of example. The final lower limit to which it is possible to grind down is optionally 0.05 mm. Thicker final thicknesses are also possible.

In the embodiment illustrated in FIG. 1 and FIG. 2, the grinding is carried out on one side from the lower side 50. Therefore, in this embodiment, the conductor 4, which is optionally a pin-shaped conductor, in particular a pin, protrudes 0.1 mm beyond the glass material 5 on the upper side 52 after enclosure. However, the conductor 4 can also be flush with the glass material in a double-sided grinding process. The glass material into which the conductor 4 is enclosed is designated with reference number 5.

FIG. 3 shows a top view looking down on a component according to FIG. 2. Identical components are assigned the same reference numbers. The conductor 4, the glass material 5 surrounding the conductor 4 and the base body 10 are clearly visible.

Figure 4A:
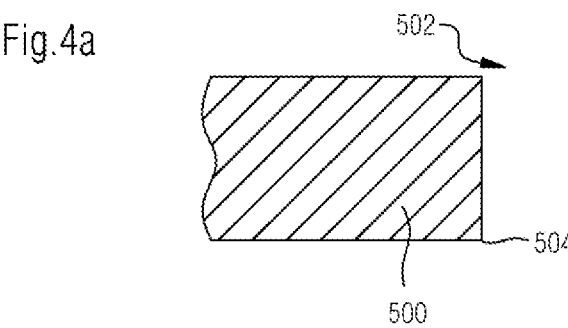
FIGS. 4a, 4b, 4c, and 4d each shows an illustration of the glass pre-tension depending on the manufacturing process of the hole.
Figure 4B:
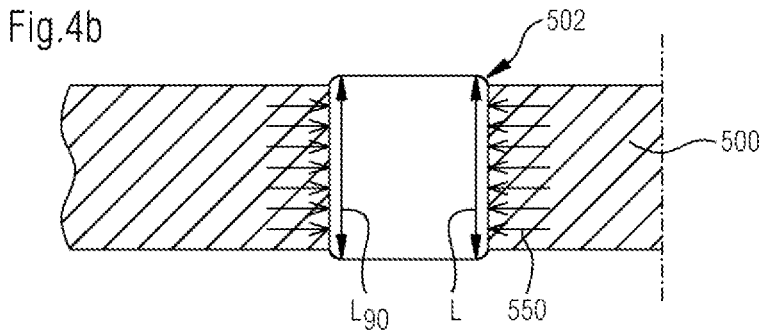

FIGS. 4a through 4d illustrate the various methods of making the opening in the base body into which the conductor is enclosed and the effects on the pre-tension that can be applied to the enclosed conductor. FIG. 4a shows a base body 500 into which an opening 502 is made by turning or milling. The opening 502 is characterized by sharp-edged corners 504. FIG. 4b shows the direction of the pressure on the glass material that is exerted on an opening 502 made in a base body 500 by turning or milling. Due to the sharp edges, an optimum pre-tension is achieved in a base body 500 in which the opening is introduced by milling/turning, inasmuch as the direction of pressure 550 from the base body is practically perpendicular, which is to say at an angle of 90° from the glass material (not shown). The fact that in the case of a turned or milled opening 502, the pressure is, in practice, below 90° on the glass material over the entire enclosure length, which is to say $L_{90°}=L$ applies, cracks in the glass material are largely excluded.

Figure 4C:
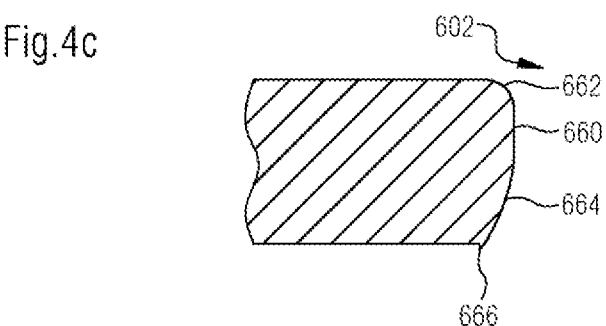
Figure 4D:
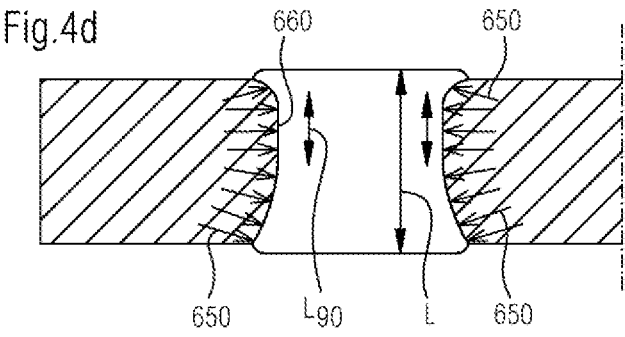

FIGS. 4c and 4d illustrate an opening 602 made by die cutting in the base body or alternatively in the ring with the corresponding directions of pressure on the glass material (FIG. 4d). As can be seen in FIG. 4c, an opening 602 introduced by die cutting shows a smooth area 660 in the center of the opening, as well as a die cutting indent 662 having a radius and a die cutting tear 664 also with a radius. The die cutting burr 666 can also be seen in FIG. 4c. If the opening made in the base body by die cutting is enclosed without machining of the die cutting indentation 662 and die cutting tear 664, the situation is as shown in FIG. 4d. Only in the area 660 in the center of the opening is the direction of pressure 650 perpendicular, which is to say it exhibits an angle of approximately 90°. In the area of the die cutting indentation 662 and of the die cutting tear 664, the direction of pressure 650 on the glass material of the base body deviates quite considerably from the optimum 90°. Accordingly, the pre-tension that is applied on the glass body is more limited in the embodiment according to FIGS. 4c and 4d compared to an embodiment according to FIGS. 4a and

4b. The length $L_{90°}$ over which the pressure is perpendicular to the glass material is lesser than the enclosure length L, which is to say in this case $L_{90°}$<L. The length $L_{90°}$ is the length of the region in the center of the opening where the direction of pressure is 90° and is designated with reference number 660 in FIGS. 4c and 4d. It is particularly advantageous if the die cutting tear 664 can be minimized. In the embodiment shown in FIGS. 4c and 4d, the die cutting tear 664 is approximately 60% of the enclosure length L. It is optional if the die cutting tear 664 is only 10% of the enclosure length L. Optionally, the die cutting tear 664 is therefore in the range of 10% to 60% of the enclosure length L. The die cutting tear thus determines the smooth or straight area 660 in which the direction of pressure is at a 90° angle. With a lesser die cutting tear, the smooth or straight area 660 becomes correspondingly longer. Therefore, as the area 660 or the smooth cut increases, the probability of cracking decreases, which is why a short die cutting tear is strived for.

Surprisingly, it has been found that when an austenitic stainless steel material with a coefficient of thermal expansion $\alpha_3$ in the range 16 to $18×10^{-6}K^{-1}$ or a duplex stainless steel material with a coefficient of thermal expansion $\alpha_3$ in the range 13 to $14×10^{-6}K^{-1}$ is used for the body part or the base body in which the enclosure is carried out, it is possible to provide a safe compression enclosure with sufficient pre-tension force, even if a pressure of 90° is not applied over the entire enclosure length L, but only over a shorter length, as shown in FIGS. 4c and 4d. However, it is disadvantageous that cracks occur in the glass material due to the high pressure of the austenitic material in the area of the compression enclosure. In order to avoid glass cracks, it is therefore advantageous to use a duplex stainless steel. With the duplex material, the pre-tension on the glass is lower than with austenitic stainless steel, and thus also the differential pressure between the pre-tension and the external glass zone, which means that the risk of glass cracking is reduced. The glass and/or glass-ceramic material has a coefficient of expansion $\alpha_2$ in the range 9 to $11×10^{-6}$ 1/K. Since the coefficient of expansion $\alpha_2$ is always more limited than $\alpha_3$, compression enclosure is present. An alumoborate glass with the main constituents $AI_2O_3$, $B_2O_3$, BaO and $SiO_2$, is optionally used for the glass material.

By selecting the various ring materials or alternatively the materials for the base body or alternatively the housing part, in which the enclosure takes place, the push-out force of the pin or conductor can be influenced by the different glass pre-tensions, which also act on the pin or conductor via the glass. This influence can be used to establish a safety vent function of the pin or conductor, which is to say an opening of the battery in the case of battery overpressure in the event of damage.

Further control possibilities that can be used to influence the opening force of the enclosed pin or conductor would be to change the thickness of the enclosure, to use different glass materials, to use glass materials with different void fractions in the glass, to structure the glass surface by the shape of the glass molding before enclosure, to structure the glass surface by the shape of the glass molding during enclosure, to structure the glass surface by a laser machining after enclosure. A structuring of the glass surface can be achieved, for example, by introducing one or more scores and/or tapers.

Such a safety vent function can also be achieved by scoring and/or tapering of the enclosed pin and/or the base body. The aforementioned measures can be carried out individually or in combination. The introduction of the structuring, in particular the scoring and/or tapering, can be carried out both on one side of the housing part or base body with one upper and lower side in the glass, housing part and/or conductor, or carried out on both sides, which is to say on both the upper and the lower side, which is to say two-sided.

The advantage of structuring the glass material for the safety vent function is that the glass is precisely dimensioned as a shaped body, so that the trigger point of the safety vent function can be set very accurately. It is optional if, for example, a groove is made in the glass material by way of a laser for the safety vent function. It is then possible to selectively set a push-out force for the conductor and thereby the trigger point, independently of the glass density and/or the thickness of the base body, which is to say the ring thickness.

FIG. 5 illustrates an electrical device according to the invention, in particular a microbattery with a feedthrough or housing part with opening according to the invention. The electrical device or alternatively microbattery is designated with reference number 10000, the feedthrough or alternatively housing part with opening 1 is designed as in FIG. 2 and FIG. 3. Components of the feedthrough that are identical to those of FIG. 2 and FIG. 3 are marked with the same reference numbers in FIG. 5. The battery cover 10020 in the form of the housing component 10050 according to the invention as a feedthrough with base body 10 and a conductor 4 enclosed in a glass material 5 is connected in a sealing manner to the battery housing 10010 of the electrical device or the microbattery by welding, in particular laser welding at the edge of the base body 10 or battery cover 10020. A connection lug 1400 is connected to the conductor 4 enclosed in a glass material 5 into the opening 3 of the feedthrough or alternatively of the housing component or alternatively of the base body 10. The battery formed in the housing 10010 is electrically connected via the connection lug 1400, which connection lug projects into the housing 10010. The pressure-tight connection of the housing cover or alternatively of the housing part 1 or alternatively of the base body 10 including the opening 3 as part of the feedthrough to the rest of the housing 10010 of the microbattery, is laid out in a cylindrical form and directly adjoins the feedthrough and can be made by welding. The welding optionally takes place between the housing part 1 or alternatively the base body 10 with opening 3 as part of the feedthrough and the optional cylindrical housing 10010, which receives the battery. The welding is pressure-tight. Pressure tight means that the helium leakage rate is less than $10^{-8}$ mbar Usec at 1 bar pressure difference. As previously mentioned, to insulate the outer conductor, in the form of the base body 10, from the inner conductor 4 in the area of the feedthrough, the component includes an insulation ring 10030 as insulation material, for example made of a glass material, a glass ceramic 5, a glass ceramic material or a ceramic. In order to be able to contact the terminal lug with the enclosed conductor, the terminal lug is executed in a curved shape.

Whereas FIG. 5 illustrates the contacting of a conductor lying in the microbattery by way of a curved-shaped terminal lug 1400, as shown in FIG. 5, FIG. 6a illustrates an external connection by way of a head 20000 made of a metallic material, optionally made of the same material as the conductor, arranged on the conductor 4. Optionally, the head is round in shape with a diameter in the range 8 to 15 mm. The diameter of the conductor, which is usually round, is in the range of 4 mm to 8 mm. The diameter of the opening made in the thin sheet metal or base body 10, for example by die cutting, is 6 mm to 10 mm. The thickness of the sheet metal or alternatively base body or alternatively housing part providing the enclosure length $Lr_e d$ is in the range of 0.05 mm to 0.6 mm. The glass material into which the compression enclosure of the conductor takes place is designated by reference number 5, and the opening made in the housing part, for example by way of die cutting as described in FIGS. 4a-4d, is designated 3. The housing part, in particular the battery cover, optionally the round base body, is designated with reference number 10. The battery cover, in particular the battery cover of the microbattery, has a substantially round shape. A conductor 4 is enclosed into the base body 10 or alternatively into the battery cover as part of a compression enclosure process in a glass or glass-ceramic material 5. In order to be able to connect the enclosed conductor 4 to an electrical device not shown, the conductor is provided with a connection head 20000 made of a metallic material. Optionally, the conductor and the terminal head 20000 are in one piece, which is to say the terminal head can be obtained by expansion during stamping. In order to prevent a short circuit between the terminal head 20000 of the conductor 4 and the base body 10 or alternatively the battery cover, which is also made of a metallic material, an insulating element, in particular an insulating washer 20010, optionally made of a glass or glass-ceramic material, a ceramic or a non-conductive organic material, is provided. Optionally, the insulating disc 20010 extends to the edge 20020 of the housing component 10. The edge 20020 of the housing component is selected such that welding, for example to a battery housing, can still be performed on the edge.

FIG. 6b once again shows the housing part 10, according to the invention, with enclosed conductor 4, with terminal head 20000 and insulating washer 20010. It can clearly be seen that the insulating washer 20010 extends to the conductor 4 and electrically insulates the entire terminal head 20000 from the main body 10. The components that are the same as those in FIG. 6a are designated with the same reference numbers. The edge is also designated 20020 in FIG. 6b.

FIG. 6c is a top view looking down on a round-shaped housing part 10 with an enclosed conductor with connection head 20000. As can be seen from FIG. 6c, the connection head 20000 covers between 60% and 90%, optionally 70% to 85%, of the area of the round housing part or base body 10.

Figure 7A:
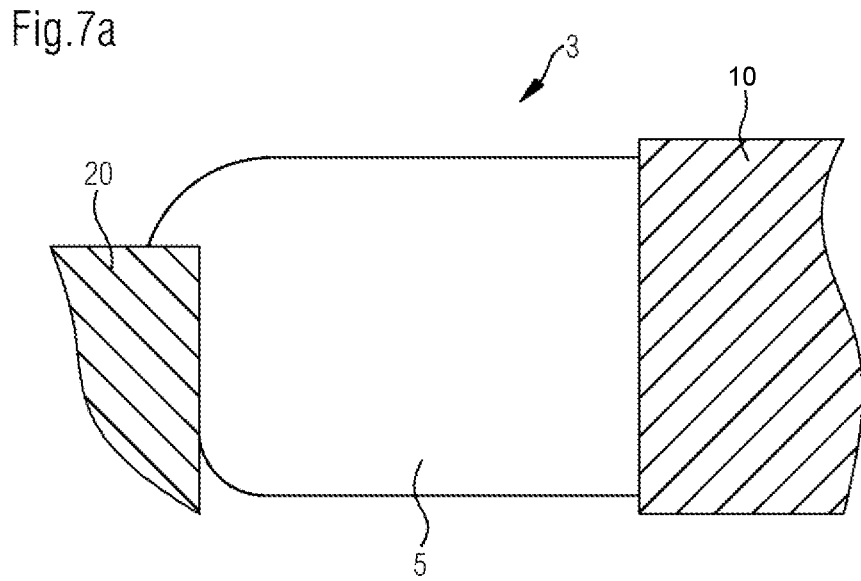
FIG. 7a shows a conductor enclosed into an opening in a housing part, in particular a base body without meniscus of the glass or glass ceramic material to the housing part, in particular to the base body.
Figure 7B:
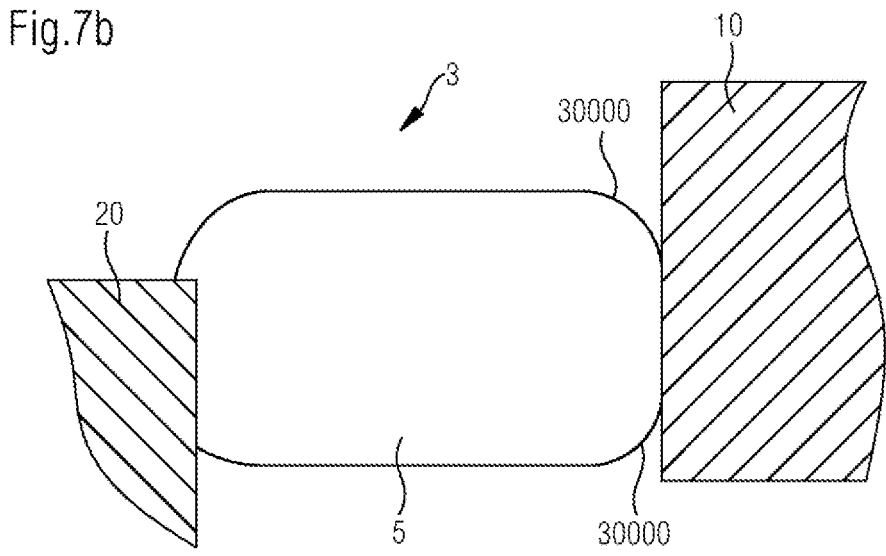
FIG. 7b shows a conductor enclosed into an opening in a housing part, in particular a base body with a meniscus of the glass or glass ceramic material to the housing part, in particular to the base body.

The enclosure of a conductor 20 into an opening 3 of a housing part, in particular a base body 10 is illustrated in detail in FIGS. 7a and 7b. In the enclosure according to FIG. 7a, the enclosure takes place over a longer length than in FIG. 7b, such that no meniscus is formed from the glass or glass ceramic material to the housing part, in particular to the base body. The configuration of the enclosure without meniscus means that there are practically no cracks in the glass material. Furthermore, a high pull-out force of the enclosed conductor is provided.

In contrast, FIG. 7b shows an embodiment of the invention in which a meniscus is formed in the glass material to the housing part or alternatively to the base body 10. The meniscus is designated by reference number 30000, the glass or glass ceramic material by reference number 5. The meniscus is formed because the enclosure length is short compared to FIG. 7a. When enclosing with a meniscus, the number of cracks increases compared to the case where no meniscus is formed in the glass material. By forming a meniscus, the pull-out strength of the enclosed metal pin, in particular a conductor, is greatly reduced compared to enclosure without a meniscus. In summary, it can be stated that in the case of enclosure in which the formation of a meniscus is avoided, the probability of the formation of glass cracks is on the one hand reduced, and on the other hand the pull-out strength is increased. In general, the thinner the base body into which the enclosure is applied, the greater the effect of the meniscus. In general, the longer the enclosure length, the greater the pull-out forces since no meniscus is then formed.

Due to the compact component, in particular housing component, into which the conductor is enclosed, the height of the entire microbattery is, for example, 5 mm, optionally 3 mm, in particular it is in the range 1 mm-5 mm, for example for button cells.

With the housing component or alternatively base body according to the invention with a conductor for a housing of electrical storage devices, in particular batteries or capacitors, makes it possible for an electrical storage device to be provided with an overall height of at most 5 mm, in particular in the range 1 mm to 5 mm.

The compression enclosure of the conductor in the glass material ensures a hermetically sealed feedthrough. In addition, high mechanical strength and/or high pull-out forces are ensured even with a thin component or alternatively a thin cover.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A housing part for an electrical device, which is an electrical storage device, a sensor housing, a battery, a microbattery, or a capacitor, the housing part comprising:
   a feedthrough, the housing part or a base body which is a part of the housing part including the feedthrough, the feedthrough having at least one opening, the at least one opening having a wall with a reduced enclosure length $EL_{red}$, the at least one opening configured for receiving a conductive material or a conductor in a glass material or a glass-ceramic material, the reduced enclosure length $EL_{red}$ being in a range of 0.05 mm to 0.49 mm, the at least one opening being a die cutting opening, which includes a die cutting tear that is in a range of 10% to 60% of an enclosure length L.

2. The housing part according to claim 1, wherein the conductive material or the conductor has a first coefficient of expansion $\alpha_1$, the glass material or the glass-ceramic material has a second coefficient of expansion $\alpha_2$, and the housing part or the base body has a third coefficient of expansion $\alpha_3$, wherein the third coefficient of expansion $\alpha_3$ is always greater than the second coefficient of expansion $\alpha_2$.

3. The housing part according to claim 2, wherein at least one of:
   the third coefficient of expansion $\alpha_3$ is in a range of $12 \times 10^{-6}$ 1/K to $19 \times 10^{-6}$ 1/K;
   the second coefficient of expansion $\alpha_2$ is in a range of $9 \times 10^{-6}$ 1/K to $11 \times 10^{-6}$ 1/K; and
   the first coefficient of expansion ai is in a range of $6 \times 10^{-6}$ 1/K to $11 \times 10^{-6}$ 1/K.

4. The housing part according to claim 1, wherein a metal of at least one of the housing part, the base body, and the conductor is one of the following materials: iron, an iron alloy, an iron-nickel alloy, an iron-nickel-cobalt alloy, KOVAR, steel, high-grade steel, stainless steel, aluminum, an aluminum alloy, AISIC, magnesium, a magnesium alloy, copper, a copper alloy, titanium, or a titanium alloy.

5. The housing part according to claim 1, wherein the housing part or the base body is a battery cover part with a thickness $D_2$, wherein $D_2$ is in a range of 0.1 mm to 1 mm or 0.1 mm to 0.6 mm.

6. The housing part according to claim 1, wherein the housing part or the base body consists of one of the following materials:

a ferritic stainless steel with a coefficient of expansion in a range 10 to $12 \times 10^{-6}$ $K^{-1}$;

a mild steel having a coefficient of expansion in a range 12 to $13 \times 10^{-6}$ $K^{-1}$;

a duplex stainless steel with a coefficient of expansion in a range 13 to $14 \times 10^{-6}$ $K^{-1}$; or an austenitic stainless steel with a coefficient of expansion in a range 16 to $18 \times 10^{-6}$ $K^{-1}$.

7. The housing part according to claim 1, wherein a glass pre-tension is set up by way of at least one material of the housing part or of the base body, the glass pre-tension also acting on the conductor via a glass and sets up a push-out force of the conductor.

8. The housing part according to claim 7, wherein through an adjustment of the push-out force of the conductor, a safety vent function of the conductor is provided, by which the electrical storage device is opened in a case of an overpressure in an event of a damage.

9. The housing part according to claim 7, wherein the push-out force of the conductor is adjusted by at least one of the following measures:

a thickness of an enclosure of the housing part;

using different ones of a plurality of glass materials;

different void fractions in a glass;

a structured glass surface due to a shape of a glass molding prior to an enclosure process;

a structured glass surface due to a shape of a glass molding during an enclosure process;

a structured glass surface due to a laser machining after an enclosure process;

scoring or tapering in the glass material on one or two sides of the glass material;

scoring or tapering in at least one of the conductor, a housing of the electrical device, the housing part, and the base body.

10. The housing part according to claim 1, wherein the conductor comprises a head part, which is a terminal head.

11. The housing part according to claim 10, wherein the housing part is configured such that an insulating element is arranged between a connection head part of the head part of the conductor and the housing part.

12. The housing part according to claim 11, wherein the insulating element is a glass, a glass-ceramic element, or a ceramic.

13. The housing part according to claim 1, wherein a material of the glass material or the glass-ceramic material is an aluminoborate glass.

14. The housing part according to claim 13, wherein the aluminoborate glass comprises $AI_2O_3$ and $B_2O_3$.

15. The housing part according to claim 2, wherein the third coefficient of expansion $\alpha_3$ is 2 to $8 \times 10^{-6}$ 1/K greater than the second coefficient of expansion $\alpha_2$.

* * * * *